(12) United States Patent
Reed et al.

(10) Patent No.: US 9,188,969 B2
(45) Date of Patent: Nov. 17, 2015

(54) ARRANGEMENT AND METHOD FOR ACCESSING DATA OF A BUILDING AUTOMATION SYSTEM COMPONENT

(75) Inventors: James C. Reed, Crystal Lake, IL (US);
Steven T. Jaworski, Grayslake, IL (US)

(73) Assignee: SIEMENS INDUSTRY, INC., Alpharetta, GA (US)

( * ) Notice: Subject to any disclaimer, the term of this patent is extended or adjusted under 35 U.S.C. 154(b) by 1201 days.

(21) Appl. No.: 12/152,445

(22) Filed: May 14, 2008

(65) Prior Publication Data

US 2010/0031177 A1    Feb. 4, 2010

Related U.S. Application Data

(60) Provisional application No. 60/938,811, filed on May 18, 2007.

(51) Int. Cl.
| | |
|---|---|
| G06F 3/048 | (2013.01) |
| G05B 19/042 | (2006.01) |
| G05B 15/02 | (2006.01) |

(52) U.S. Cl.
CPC .............. *G05B 19/042* (2013.01); *G05B 15/02* (2013.01); *G05B 2219/25418* (2013.01); *G05B 2219/2642* (2013.01)

(58) Field of Classification Search
CPC ..... G06F 3/048; G06F 3/0481; G05B 19/042; G05B 15/02; G05B 2219/25418; G05B 2219/2642
USPC .................................. 715/733, 734, 744, 771
See application file for complete search history.

(56) References Cited

U.S. PATENT DOCUMENTS

| | | | |
|---|---|---|---|
| 6,910,068 B2 * | 6/2005 | Zintel et al. ................... 709/220 |
| 2002/0016639 A1 | 2/2002 | Smith et al. | |
| 2004/0015366 A1 * | 1/2004 | Wiseman et al. ................. 705/1 |
| 2006/0080408 A1 * | 4/2006 | Istvan et al. ................... 709/219 |

\* cited by examiner

*Primary Examiner* — Andrey Belousov

(57) ABSTRACT

A method of providing access to information on a controller in a building automation system includes providing an external definition file, the external definition file including a first section that includes an application interface definition that defines a set of user interface displays and a second section that defines a functionality of objects using protocol-specific data. The method also includes employing a host application to create a first node comprising one or more objects based upon the protocol-specific data, the first node configured to communicate and exchange information with the controller. The method further includes employing the host application to create a user interface element based on the application interface definition, the user interface element configured to provide a user interface to data relating to the controller received from the first nodes.

11 Claims, 4 Drawing Sheets

ARRANGEMENT AND METHOD FOR ACCESSING DATA OF A BUILDING AUTOMATION SYSTEM COMPONENT

This application claims the benefit of U.S. Provisional Patent Application Ser. No. 60/938,811, filed May 17, 2007, which is incorporated herein by reference in its entirety.

FIELD OF THE INVENTION

The present invention relates to building automation systems, and more specifically, to software applications used in building control systems.

BACKGROUND

Building automation systems or building control systems are systems that operate to monitor, control and manage various physical operations within a building. For example, a heating, ventilation and air conditioning (HVAC) system is a building automation system that monitors, controls, and manages the building environmental temperature, as well as other related functions. Another example of a building automation system is a building safety or fire safety system, which manages the detection of dangerous conditions as well as the notification of alarm conditions throughout a building or facility.

Building automation systems include, at least for commercial and industrial settings, interconnected control panels or controllers that are dispersed throughout a building. These distributed controllers perform control and interface functions to terminal devices such as temperature sensors, ventilation dampers, smoke detectors, etc. The distributed control panels/controllers are typically interconnected with each other via a building network, which can take many forms. In this manner, the distributed control panels can share information, such as, for example, alarm information. The building network also provides a means by which other centralized or remote user terminals or clients may access information from the distributed controllers.

One challenge with regard to building automation devices is that they often include devices from multiple manufacturers that must share information with each other. While some standards for building automation devices exists, different devices from different manufacturers can often use various interfaces, protocols, and applications. The use of devices from multiple manufacturers is common for a number of reasons. In complex systems, it is often impossible, or at least impracticable, to use a single source for all sensors, controllers, ventilation dampers, air handling units. Moreover, many systems grow incrementally over several years, often resulting in incorporation of products of different manufacture.

In order to allow diverse products to communicate and share information, many building automation system devices are configurable to provide a data interface using one or more standard protocols and/or data formats. Both proprietary and open protocols interfaces are employed in large building systems. Device manufacturers often find it desirable to adapt their products to interface with several of the most popular system configurations. A common open protocol network service is the LONWORKS® network service (LNS), available from Echelon Corp. Another commonly used open protocol is the BACnet protocol available in systems from Siemens Building Technologies, Inc., which is based on an ASHRAE standard network protocol known in the art.

One important aspect of a building automation system (BAS) is the ability to provide user interface applications that can access data on field devices. Contemporaneous BAS system data is typically accessible from the distributed control panels, or even from the terminal devices themselves (sensors, etc.). Such access can allow a computer that is attached to the building network to read values from controllers, provide set points to controllers, perform tests, and even commission a new device on the system. In general, an application provides a user interface from which requests to view, control or monitor data may be received from a human operator. Upon receiving a request for information, the application operates by providing a request to a data management system within the building automation system. The data management system operates to determine the logical location (i.e. node) of the device that maintains the requested information and further determines the proper driver/protocol for obtaining useful information from the device. The data management system then formulates a request that is transmitted to the device in question via the building network. The remote device (e.g. a field panel controller) receives the request, and, if everything operates properly, responds with the requested data. The data management system receives the responsive data, prepares the data into the format expected by the application, and then passes the information to the application.

These applications, which allow user access to BAS data points, are often custom-configured for each building. The custom-configured software applications naturally incur significant development costs. To address these costs, standard applications having broad applicability are desirable. While it is possible to develop and employ a standard suite of applications useful in the building control environment, the varied needs of facility managers, building occupants, and building structures nevertheless often requires at least some custom-developed software.

One particularly troubling source of costs is the cost of developing applications for operating on a particular field device, or more specifically, developing human interfaces to the software running on a field device. As discussed above, the various controllers, sensors, actuators, etc. can be of various manufacturers. As a result, such devices have different test requirements, commissioning requirements, and the like. It is often necessary to develop a specific software to interact with the field device firmward or software each model of device to perform these tasks. There is a need to reduce these costs.

SUMMARY OF THE INVENTION

The present invention addresses, the above-cited need, as well as others, by providing a set of software objects in the form of a plugin component that is automatically generated using a data file, the data file identifying a user interface and protocol-specific data for communicating with a specific device (or application running on a specific device). A host program interprets the data file and creates an instance of a user interface object, and creates one or more objects that process data provided to or received from a device in a building automation system. Using this system, plugins for controller applications may be defined using the text file without requiring new software to be developed. The user interface component may even be reused in some cases.

A first embodiment is a method of providing access to information on a controller in a building automation system that includes providing an external definition file. The external definition file includes a first section that includes an application interface definition that defines a set of user interface displays and a second section that defines a functionality of objects using protocol-specific data. The method also includes employing a host application to create a first node comprising one or more objects based upon the protocol-specific data, the first node configured to communicate and exchange information with the controller. The method further includes employing the host application to create a user interface element based on the application interface definition, the user interface element configured to provide a user interface to data relating to the controller received from the first nodes.

A second embodiment is also a method of providing access to information on a controller that includes a step of providing an external definition file, the external definition file including a first section that includes an application interface definition that defines a set of user interface displays and a second section that defines implementation of objects using protocol-specific data. The method further includes employing a host application to create a first node comprising one or more objects based upon the protocol-specific data, the first node configured to communicate with the controller, and employing the host application to create a view dialog element based on the application interface definition, the view dialog element configured to provide a user interface to data relating to the controller received from the first nodes. The method also includes generating data in a first controller relating to a building control system, and providing first information representative of the generated data to the first node. The first node processes the first information to generate second information, wherein the process employed by the first node is defined in the external definition file. The interface object displays information representative of the second information.

The above described features and advantages, as well as others, will become more readily apparent to those of ordinary skill in the art by reference to the following detailed description and accompanying drawings.

DETAILED DESCRIPTION

At least some embodiments of the present invention are intended for use in a building automation system, such as a system that monitors, controls, and manages HVAC operation within building or other facility. Other suitable building automation systems include building security systems, building (fire) safety systems, and building lighting systems.

Figure 1:
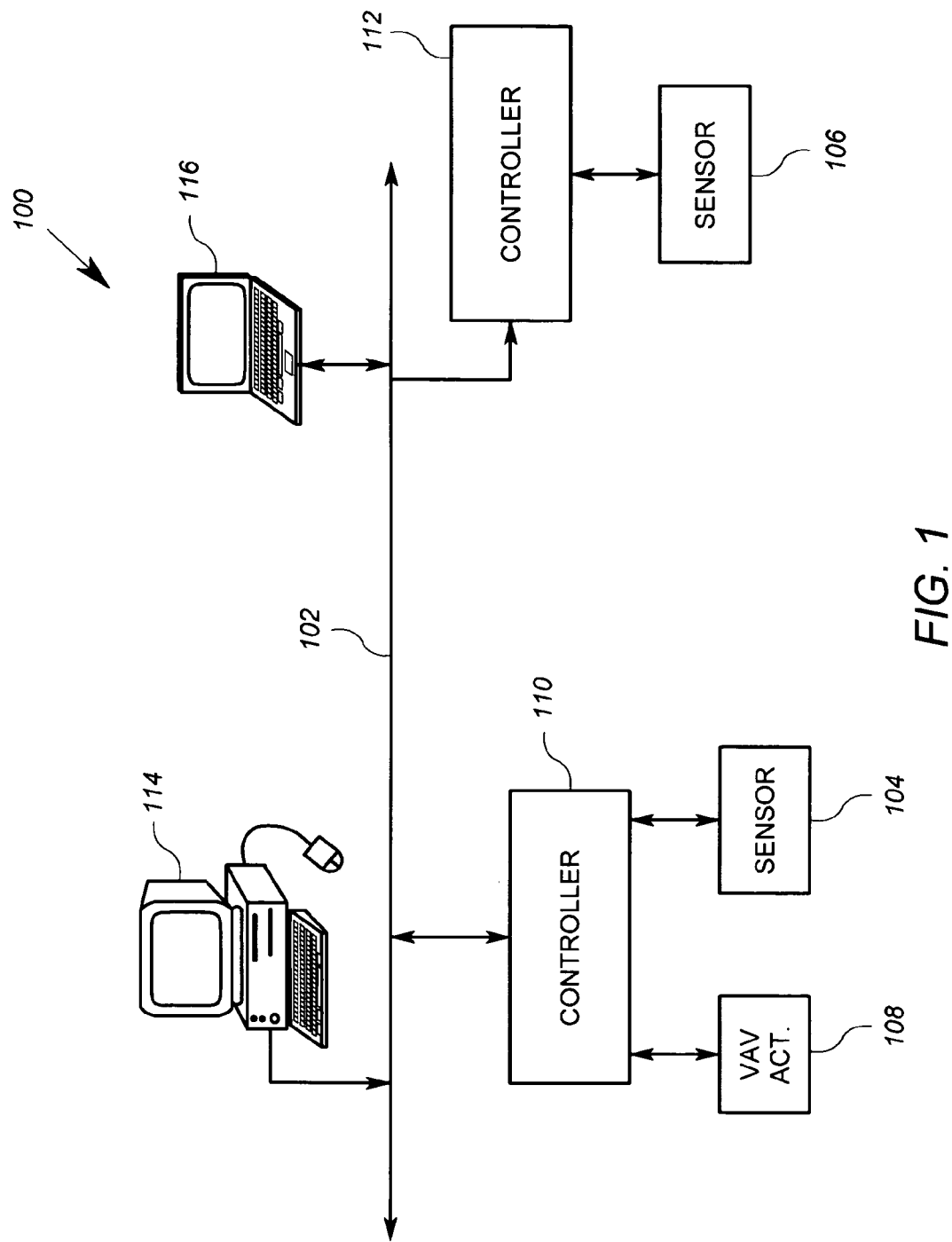
FIG. 1 shows a portion of an exemplary building automation system (BAS) 100 that incorporates at least one embodiment of the invention.

FIG. 1 shows a portion of an exemplary building automation system (BAS) 100 that incorporates at least one embodiment of the invention. The BAS includes a communication network 102, a plurality of BAS devices 104, 106 and 108, a plurality of controllers 110, 112, a work station 114 and a portable tool 116.

The communication network 102 may suitably be a network that employs a LONWORKS® network service (LNS). LONWORKS® is a registered trademark of Echelon Corporation. As is known in the art, an LNS provides an open protocol network and variable definitions for elements of a BAS. However, it will be appreciated that embodiments of the invention may be implemented in BAS systems that use other network environments.

The BAS devices 104, 106, 108 are physical devices that represent the interface to the building facility. In this example, the BAS devices include a first sensor 104, a second sensor 106, and a variable air volume (VAV) actuator 108. The first sensor 104 may suitably be a temperature sensor that generates measurements of temperature of the ambient air. For example, the first sensor 104 may be a room temperature sensor that generates data representative of the temperature within the room in which the first sensor 104 is located. The second sensor 106 may also be a temperature sensor, but located in another place, such as in another room, or in an air duct. The VAV actuator 108 is a controlled actuation device that is coupled to ventilation dampers, not shown. The VAV actuator 108 is operably coupled to open or close the ventilation dampers in response to control signals. The ventilation dampers, not shown, are typically located at or near the input duct of a room, as well as in other places. The VAV actuator 108 controls the flow of air into the room by opening and closing the dampers.

A typical BAS in a commercial, industrial, or multi-family residential building will include a large number of sensors, actuators, and controllers. Thus, the small number of devices shown in FIG. 1 is only provided as an illustrative contextual backdrop for the exposition of the inventive embodiment described herein.

Referring again specifically, to FIG. 1, one of the functions of the BAS 100 may be to employ temperature information generated by one or more sensor such as the sensors 104, 106 to control the operation of the VAV actuator 108. For example, as discussed above, the VAV actuator 108 may suitably be used to control a ventilation damper in order to control the flow of air into a room. In particular, the VAV actuator 108 may control a ventilation damper that is located between a chilled air duct and a room. In such an example, if a sensor (e.g. sensor 104) indicates that the temperature within the room is too high, then the BAS 100 may cause the VAV actuator 108 to open ventilation dampers to increase the flow of chilled air into the room. Contrariwise, if the sensor (e.g. sensor 104) indicates that the temperature is too low, then the BAS 100 would cause the VAV actuator 108 to close the ventilation dampers to decrease the flow of chilled air into the room. Such operations are well known in the art.

The controllers 110 and 112 are processing devices that typically perform multiple functions. The functions of the controllers 110, 112 are typically defined in software or firmware applications, hereinafter referred to as controller applications, which are maintained and executed in each of the controllers 110, 1112. The controllers 110, 112 are distributed throughout the building, and are interconnected via the network 102. In most BAS systems, the controllers 110, 112 serve in part as an interface to the various BAS devices. In other words, the controllers 110, 112 (and specifically, the controller applications) maintain or have access to values generated by or regarding the sensors 104, 106 and the actuator 108. The controller applications of the controllers 110, 112 also typically carry out control operations at least at a local level. In the example shown in FIG. 1, the controller 110 is operably connected to the sensor 104 and the VAV actuator 108, and the controller 112 is operable connected to the sensor 106. It is the controller application of the controller 110 that determines whether the VAV actuator 108 should further open or close the ventilation dampers, based on temperature values received from the sensor 104, to increase or decrease the flow of chilled air into the room.

Controllers are well known in the art, and include by way of example the Staefa Predator controller available from Siemens Building Technologies, Inc., of Buffalo Grove, Ill. A typical control system for a commercial or industrial building will include many controllers such as the controllers 110, 112.

The control station 114 is a computer work station that is operably connected to the communication network 102 to receive information from all of the controllers 110, 112. The control station 114 provides a single point access to much of the information in the BAS 100, including the ability to monitor, manage, control and review conditions in the building and the BAS 100. To provide user interactivity, the control station 114 also executes a number of applications. The applications operate to obtain information about the system 1100 from the controllers 110, 112 and present in the information in a user interface, for example, a graphical user interface. To provide access to data on the controllers 110, 112, the applications at the control station 114 must interact with the controller applications at the controllers 110, 112.

By way of an example control station application, an application may provide trending or historical information for the temperature in the room in which the sensor 104 is located. Such an application would periodically request information from the controller application at the controller 110 regarding the temperature from the sensor 104. To this end, the application at the control station 114 would have to access a driver or server that is capable of obtaining information from the sensor 104 and exposing an output that includes a temperature value in a known protocol. By way of example, if the controller 110 is a LonWorks device, the application in the control station 114 would communicate with the controller application of the controller 110 via an LonWorks driver or LNS server, not shown, which would typically also be resident in the control station 114. The LNS server provides a standard interface that the control station application can understand, and is configured to communicate with the LNS controller application. The control station application receives the data from the LNS server and processes to perform the desired processing or display operation. The application at the control station 114 presents the information to the user via the application's graphical user interface.

The portable tool 116 may suitably be a portable computer that can connect to the communication network 102 at any point, or directly to a network node such as the controllers 110 and 112. The portable tool 116 also executes software that accesses data in devices such as the controllers 110, 112. The portable tool 116 may be used for troubleshooting, testing, commissioning and resetting devices when operations from the control station 114 would not be sufficient or suitable. As with the control stations 114, the operations of the portable tool 116 must access data from one or more devices in the BAS 100. To provide access to data in the various devices, the portable tool 116 must also include a server, driver or interface, such as the LNS server, similar to that of the control station 114. For example, to communicate with the controller 110, the control station 114 must execute software that communicates with one or more controller applications executed by the controller 110.

The steps involved in commissioning, testing and troubleshooting devices vary from device to device. Thus, interfaces to various controller applications necessary to perform such operations also vary greatly from device to device. As a consequence, in the prior art, separate code was necessary to provide a user interface (i.e. on the portable tool 116) for each operation for each device type and manufacture. This results in significant development costs. In accordance with embodiments of the present invention, however, access to information on controller application (or other device application) is provided by software objects are created in the form of plugins. The plugins are formed from a text definition file. In particular, the text definition file is used by a host application to form a node comprising a set of objects that perform defined operations with data received from or provided to a target device application, and also to form a graphical user interface for such data. The development or revision of a plugin may readily be accomplished by editing the text definition file, instead of requiring extensive software revision.

Accordingly, the plugin, after being created, operates to access data from controller applications resident on a controller 110, 112, in order to provide a view or display that allows information to be exchanged with a human operator. For example, the plugin allows a user to view values maintained by the controller application resident on the controller 110, 112, and also allows the user to enter commands or data that is passed to the controller application. It is noted that the plugins may be configured to access data for devices other than controllers, such as sensors or actuators, so long as those devices execute applications that expose an accessible interface.

Figure 2:
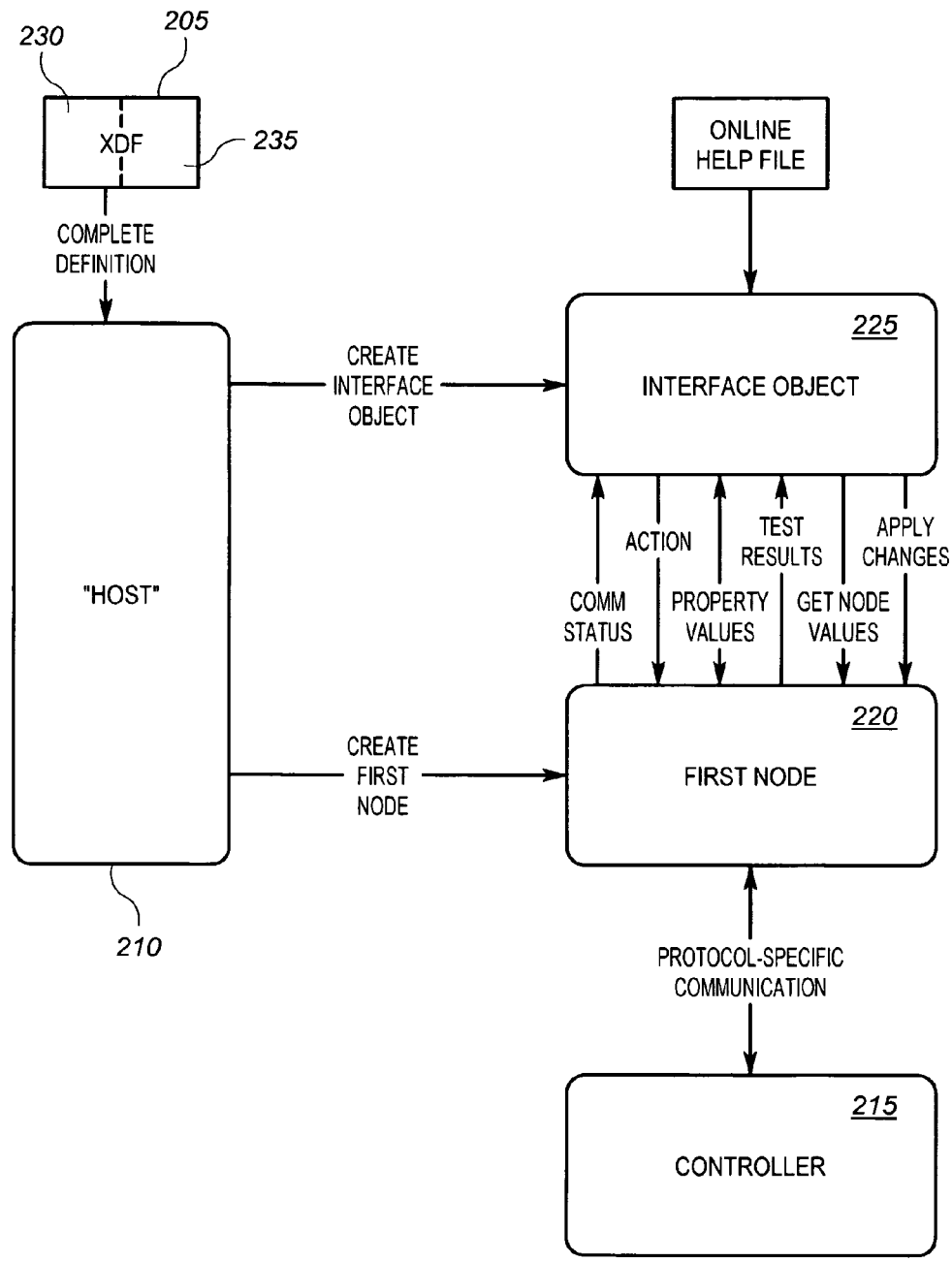
FIG. 2 shows a block diagram illustrating elements of a system and method according to an exemplary embodiment of the invention.

FIG. 2 shows a block diagram illustrated elements of a system and method according to the invention. The elements of FIG. 2 shows an arrangement of the elements that form a plugin that accesses information in a controller 215, which may suitably represent the controller 110 or 112 of FIG. 1. The software elements and data files of FIG. 2 may suitably be resident on the control station 114 and/or the portable tool 116 of FIG. 1. Details regarding the physical configuration of the control station 114 and portable tool 116 would be known to those of ordinary skill in the BAS art. By way of example, the control station 114 may have the physical configuration of an INSIGHT™ workstation available from Siemens Building Technologies, Inc. The portable tool 116 may be a suitably outfitted portable "laptop" computer.

The arrangement includes an XDF file 205, a host application 210, a controller 215, a first node 220 and an interface object 225. The XDF file 205, host application 210, first node 220 and interface object 225 may all suitably reside on the same physical device, such as the portable tool 116 of FIG. 1, or the control station 114 of FIG. 1.

The XDF file 205 is an external definition file that includes definitions for the user interface and data mappings to a specific application that relates to the controller 215 (i.e. the controller application). To this end, the XDF file 205 includes a first section 230 that defines a set of user interface displays in the interface object 225 that perform input/output interface operations with respect to the first node 220. The XDF file 205 also includes a second section 235 that defines the implementation of the first node 220 in terms of protocol-specific data. Specifically, the protocol-specific data defines how data is received from or provided to a controller application (on the controller 215), and how data is provided to and received from the interface object 225, including any format conversion (data mapping) that is required between the interface object 225 and the controller application. The XDF file 205 is preferably a single file, but may suitably comprise two separate files, each containing one of these sections 230, 235. The XDF file 205 is preferably implemented as an XML file format.

The host application 210 is a software arrangement that is configured to receive the XDF file 205 and generate the first node 220 and the interface object 225 based thereon. In particular, the host application 210 forms the first node 220 based on the second section 235 of the XDF file 205. The host application 210 then forms the interface object 225 based on the first node 220 and the first section 230 of the XDF file 205. To this end, the host application 210 is preferably configured as an environment in which a plugin can run. In one embodiment, the generated first node 220 and the interface object 225 form a plugin in the form of a LONWORK® network services (LNS) plugin. In this embodiment, the first node 220 is a collection of one or more objects that forms a "node" on the LNS network service, and the interface object 225 defines a user interface program or object.

The first node 220 performs data translation and processing for data received from the controller 215. The first node 220 also exposes an interface for data to be displayed on the interface object 225. To create the first node 220, the host application 215 instantiates objects based on existing dynamic linked library files defining interaction with controller applications within the LNS environment. The host application 215 instantiates the objects using the information from text file in the XDF 205, which defines specifically what data is accessed, and how it is processed.

The interface object 225 presents data received from the first node 220 in a graphical format. Moreover, the interface object is configured to receive user input and present such inputted data to the first node 220 for submission to the controller 215. To this end, the first node 220 also provides an interface for receiving user input in the form of commands to cause an action by the controller application. In such a case, the first node 220 maps the user input to requests for data and/or action in the formats employed by the controller application at the controller 215.

Figure 3:
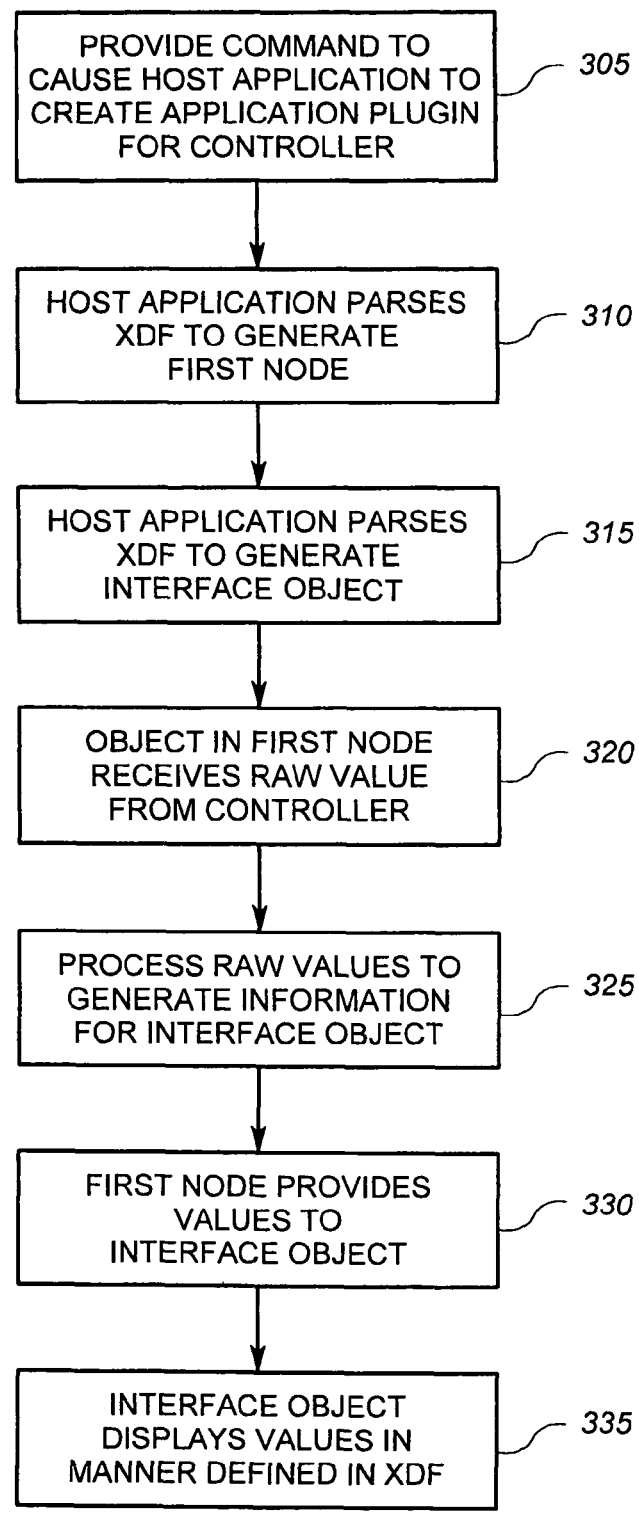
FIG. 3 shows a flow diagram of an exemplary set of operations according to the embodiment of the invention shown in FIGS. 1 and 2.

As mentioned, the interface object 225 and the first node 220 in one embodiment form an LNS plugin and meet the technical requirements of an LNS plugin. The host 210 is a software arrangement that is configured to generate plugins based on the XDF file 205. To this end, the host 210 is programmed to perform the following steps as shown in FIG. 3.

As shown in step 305, the host 210 is first invoked to form a plugin for the controller application. It will be appreciated that when the term "controller" or "controller 215" is referenced, it is meant to include the controller 215 itself and specifically the controller application of interest that is running on the controller 215.

As will be discussed below in connection with FIG. 4, the initiation of the plugin creation process may occur through an LNS director, which is known in the art. Upon such initiation, the host 210 is provided with a command that includes a reference (arguments) identifying the XDF file to be employed. It will be appreciated that the host application 210 in this embodiment is designed to operate in the programming environment that is available, and thus employs APIs, DLLs, and other features available for use as plugins. Within that framework, the host application 210 can be used to generate various plugins for various controller applications by instantiating the plugin using different XDF files. Thus, in step 305 in this exemplary operation, the host 210 is is provided with a command or operation that includes identification of the XDF file 205, which would typically be one of several available XDF files stored in the memory of the portable tool 116 or workstation 114.

In step 310, the host 210 parses the second section 235 of the XDF 205 in order to create the first node 220. The second section 235 includes protocol specific data that is used to form objects that both receive data from the controller 215 and process the data into a format useful to the interface object 225. The second section 235 further includes protocol specific data that is used to form objects that process commands and data received from the interface object 225 into formats useful to the controller 215. The objects of the first node 220 may perform processing such as averaging, combinatorial logic and other mathematical operations on data received from the controller 215. The host 210 contains the engine to parse the definitions of such functions in the text XDF file and formulate or instantiate the corresponding objects within the node 220. To this end, the host 210 accesses various dynamic linked libraries (DLLs) that provide the framework of the objects that are instantiated. In the LNS environment, DLLs are provided that enable plugins that access LNS controller applications. Using such DLLs, the objects provide the communication interfaces necessary to physically communicate with the controller application.

In step 315, the host 210 formulates the interface object 225 by parsing the first section 230. The first section 230 provides a definition of the user interface in text format. Typically, one or more dynamically linked libraries within the same computer (i.e. the portable tool 114 or workstation 116) includes the basic graphical engine elements. The arrangement of graphic elements in such an environment may readily be accomplished via an XML text file. By way of example, the .NET "controls" like TextBox, ComboBox, provided by the Microsoft .NET Framework API, may be referenced via text files such as the XDF 205. The host 210 further connects or binds the data interface of the application object 225 with objects in the first node 220, which have already been instantiated. In other words, if a text line in the first section 230 of the XDF file 205 defines that an average temperature is to be displayed, then the host 210 identifies the formulated object in the first node 220 that provides average temperature and binds that display operation to that object.

After step 315, the plugin, which consists of the first node 220 and the interface object 225 is operational. This plugin comprises a collection of objects that allows a user using the portable tool 116 (or workstation 114) to perform selected operations (as defined in the XDF 205) on the controller 215. One advantage of the configuration of FIG. 2 is that different plugin functions may readily be defined using a text file. The operations that perform the communication, binding, and formulation of a display are configured through the host 210, which is reusable for multiple applications. This reduces the amount of code that must be generated for each new interface that accesses and processes data from a controller application (or other device application). Moreover, the first section 230 of the XDF 205 may be reused in controller applications that use a different protocol, for example, a protocol other than LonWorks. In other words, an XDF file for a controller that uses a different protocol may employ the same text file as in the first section 230, even though a different protocol specific text file is employed in the second section 235 of the XDF 205.

While the above-described method and system requires software development to create the host application 210, the host application 210 may be reused for any of a plurality of applications that may be implemented with respect to the controller 215.

Referring again to FIG. 3, steps 320-335 show an exemplary operation of the plugin formed by the first node 220 and the interface object 225. In general, the interface object 225 causes display of a graphical user interface that includes, among other things, dynamic text or graphic elements that are representative of a characteristic of the building control system. The exemplary operation of steps 320-335 illustrate how a value from the controller 215 (e.g. controller 110 of FIG. 1) is retrieved and displayed by the application.

Consider an example wherein the controller 215 is the controller 110 of FIG. 1. In such a case, the controller 110/215 controls a VAV actuator (e.g. actuator 108) to maintain the flow of chilled air into the room based on a temperature of the room. The temperature of the room is provided by a temperature sensor (e.g. sensor 104) that is located in the room and operably connected to the controller 110/215. The plugin application in this example may be an application that provides a display of a temperature value in degrees Fahrenheit, a display of a percentage-open value of the ventilation damper attached to the actuator (i.e. damper position), and a control that may be used to force the damper further open or further closed. Such an application may be used to allow a technician to check a controller to ensure proper operation of the damper, among other things.

In order to display the current state of the damper position and temperature, values must be obtained from the controller 215, which either maintains, or at least can get access to such values. The exemplary operation of steps 320-335 illustrate how such data would be retrieved and displayed. The operations of steps 320-335 discussed below show the general operation of retrieving values from an attached controller or field panel, as well as a specific example of retrieving damper position and temperature from the controller 110 of FIG. 1.

With respect to the general operation, in step 320, objects within the first node 220 obtain raw values from the controller 215 that are pertinent to the plugin. The method in which such information is accessed in terms of the specific controller design is defined in the external definition file XDF 205 that was used to define the first node 220. The data is physically received via the communication network (e.g. network 102 of FIG. 1), or possibly through a communication port in the controller 215 itself. The specifics of the physical and transport communication protocols are generally defined in the host application 210, and not the XDF 205. The XDF 205, by contrast, provides protocol specific data formats and data processing information.

Considering again the example of displaying damper position and temperature maintained within the controller 140, in step 320, an object within the first node 220 requests and receives information representative of temperature and the damper position from the controller 215. Such information may, for example, be maintained in the controller 215 as values on an abstract scale between 0-255. The object within the first node 220 is configured to identify and address the appropriate outputs exposed by the controller 215 to obtain the raw temperature and position information.

Referring again to the general operation of the application plugin, in step 325, the object within the first node 220 then processes the raw data received from the controller 215 to information useful to the interface object 225. The processing may include data format conversion, mathematical operations such as averaging, filtering etc., combinatorial operations, and so forth. Such operations are defined in the XDF 205 that was used to create the first node 220.

In the specific example described above, in step 325, the first node 220 would convert the protocol-specific values (0-255) received for the temperature into a value representative of temperature (i.e. degrees Fahrenheit) in the standard employed by the interface object 225. Similarly, the object within the first node 220 converts the protocol-specific value (0-255) for the damper position into a value representative of a percentage (e.g. 0%-100%) in the standard employed by the interface object 225.

In step 330, the first node 220 provides processed values to the interface object 225. The processed values are in the format expected by the interface object 225. Because the format/interface between the interface object 225 and the first node 220 is independent of the format of the controller 215, it is apparent that the same interface object 225 may be used for various types of controllers using various protocols. However, each of the various types of controllers having different data formats would likely require a different first node 220, which would be responsible for converting data specific to the controller to standard data for the interface object 225.

In the operation of step 330 in the specific example discussed above, the first node 220 provides the converted temperature (degrees Fahrenheit) and damper position (percentage) values to the interface object 225.

In step 335, the interface object 225 displays the values in the format that is defined in the XDF 205. In the example described above, the interface object 225 would display the temperature in degrees Fahrenheit and the position of the damper as a value between 0% and 100%. If DLL support for animated or dynamic graphic objects is available, then the display may suitably be graphical, such as a "thermometer" style bar graph or a "tachometer" style radial graph, by way of example. The XDF 205 would in such case provide the definition of how the data is to be presented, and the host application 210 would invoke the appropriate object using the available DLLs. However, generally available .NET graphics support provides DLLs sufficient to present information on a GUI in at least textual form in an environment of buttons, pulldown menus, etc.

As discussed above, it will be appreciated that objects in the first node 220 may perform more complicated operations with raw data received from the controller 215. For example, the application plugin may further display to the user a five minute running average of the temperature (or other value) as opposed to instantaneous measurements. In such a case, the first node 220 would average temperature values received from the controller 215 and provide the converted average value from time to time to the interface object 225.

While the operations of steps 320-335 illustrate how data received from a controller 215/110 is displayed via the first node 220 and interface object 225, the first node 220 and interface object 225 also cooperate to transfer values received from the user interface (mouse click, data entry etc.) to the controller 215/110. For example, a "command" may be obtained from a user via the interface object 225. The interface object 225 passes the "command" to the first node 220. An object within the first node 220 processes the command data and generates the appropriate inputs to the controller 215 to carry out the command operation. The above operations of the first node 220 and interface object 225 are defined again by the XDF 205. The controller application of the controller 215 then carries out the commanded operation.

While the above described embodiment may have application in various network environments, the embodiment of FIGS. 1 and 2 is particularly suited for use in an LNS environment. FIG. 4 shows in further detail a first embodiment of the method and system of FIG. 2 is implemented within an LNS plugin. The method and system of FIG. 4 includes an external definition file (XDF) 405, an RDF 410, a host application 415 that includes a main component 418 and a Visual Basic plugin host component 420, an LNS director application 425, a first node 430, an interface object 435, an LNS server 440, and a controller 445.

Similar to the XDF file 205 of FIG. 2, the XDF file 405 is an external definition file that includes definitions for the user interface and data mappings for a specific application that relates to the controller 445. To this end, the XDF file 405 includes a first section 450 that defines a set of user interface displays that perform input/output data operations with respect to the controller 445, and specifically with the first node 430, which is in turn connected to the controller 445. The XDF file 405 includes a second section 455 that defines the implementation of the first node 430 in terms of protocol-specific data. As with the XDF file 205 of FIG. 2, the XDF file 405 of FIG. 4 may, if desirable, comprise two separate files, each containing one of these sections 450, 455. However, a single XDF file is contemplated in this embodiment.

The RDF file 410 is a resource definition file that contains a definition of LONmark variable types for the controller 415. In general, building control devices on an LNS network employ standard variables for use in the LNS-based system. The RDF file 410 provides the variable definitions to allow the plugin to interact with the LonMark-compatible controller 445. For example, the RDF 410 provides resources (data type and engineering unit/conversion definitions) used to convert physical data (bytes) into structured engineering data.

The host application 415 is an exemplary embodiment of the host application 210 of FIG. 1. Accordingly, the host application 415 is an application that is configured to receive the XDF file 405 and generate the first node 430 and the interface object 435 based thereon. The host application 415 further parses the RDF file 410 in order to allow the first node to encode and decode the raw data transferred within the protocol messages. In this embodiment, the host application 415 is configured as an environment in which LNS plugins may be executed, and is launched by the LNS director 425.

To this end, the host component 415 has the Visual Basic component 420 and a main component 418. The Visual Basic component 420 is employed because LNS plugins must be implemented as ActiveX out-of-process automation servers, and this may be carried out in a Visual Basic environment. The main component 418 carries out the general operation of creating the first node 430 and the interface object 435. The main component 418 may in some embodiments operate as a plugin using COM technology. As is known in the art, the LNS environment is based in and compatible with ActiveX and COM technologies.

However, given the advent of .NET, which is interoperable with COM technology, it may be desirable to formulate the main component 418 as a .NET component. The .NET component provides the flexibility and other advantages of the .NET environment, including accessibility to a greater universe of code libraries (i.e. DLLs). A .NET plugin, however, will not work directly in the LNS environment. Accordingly, as shown in FIG. 4, the Visual Basic component 420 interacts with the .NET main component 418 via a shell plugin 419. The shell plugin 419 is an ActiveX/COM environment plugin that interacts with a .NET plugin implementation (i.e. the .NET host component 418) using the COM operability framework available in the .NET environment. In the embodiment of FIG. 4, the COM shell plugin performs a shell function between the Visual Basic component 420 and the .NET component 418. The COM shell plugin acts as a passthrough component that allows operation of the .NET plugin component 418 within the normal LNS environment. The COM shell plugin 420 does not otherwise carry out the functionality of the host component 415. By contrast, the .NET component 418 carries out the main function of the host component 415. The .NET component 418 may then access libraries available in the .NET environment to create the first node 430 and the interface object 435.

The LNS director 425 is a standard LNS component that is available from Echelon corporation. The LNS director 425 is a software object that provides access to other LNS components, and has the ability to invoke LNS plugins. In this embodiment, the LNS director 425 is capable of generating an LNS plugin API command that causes the host component 415 to execute so as to create the first node 430 and interface object 435.

The first node 430, is similar to the first node 220 of FIG. 2. The first node 430 is a collection or graph of objects that process data between the format required for displaying information via the interface object 435, and the format provided by the controller 445 in the LNS environment. The first node 430 is generated based on the XDF 405, which defines how the data will be mapped/processed between the LNS server 440 (which is the LNS representation of the controller 445) and the interface object 435.

The interface object 435 provides a graphic user interface (GUI) function of the plugin. The interface object 435 is also generated based on the XDF 405, which defines textually the format of the user interface, as well as the type of information that is to be displayed. The interface object 435 implements the GUI using available dynamic linked libraries containing the graphics engine components. The interface object 435 also includes the operations that exchanges information with the first node 430.

The LNS server 440 is an object that provides an interface handling communications between the controller 445 and the first node 430. The LNS server 440 is also initialized via the host component 415.

Figure 4:
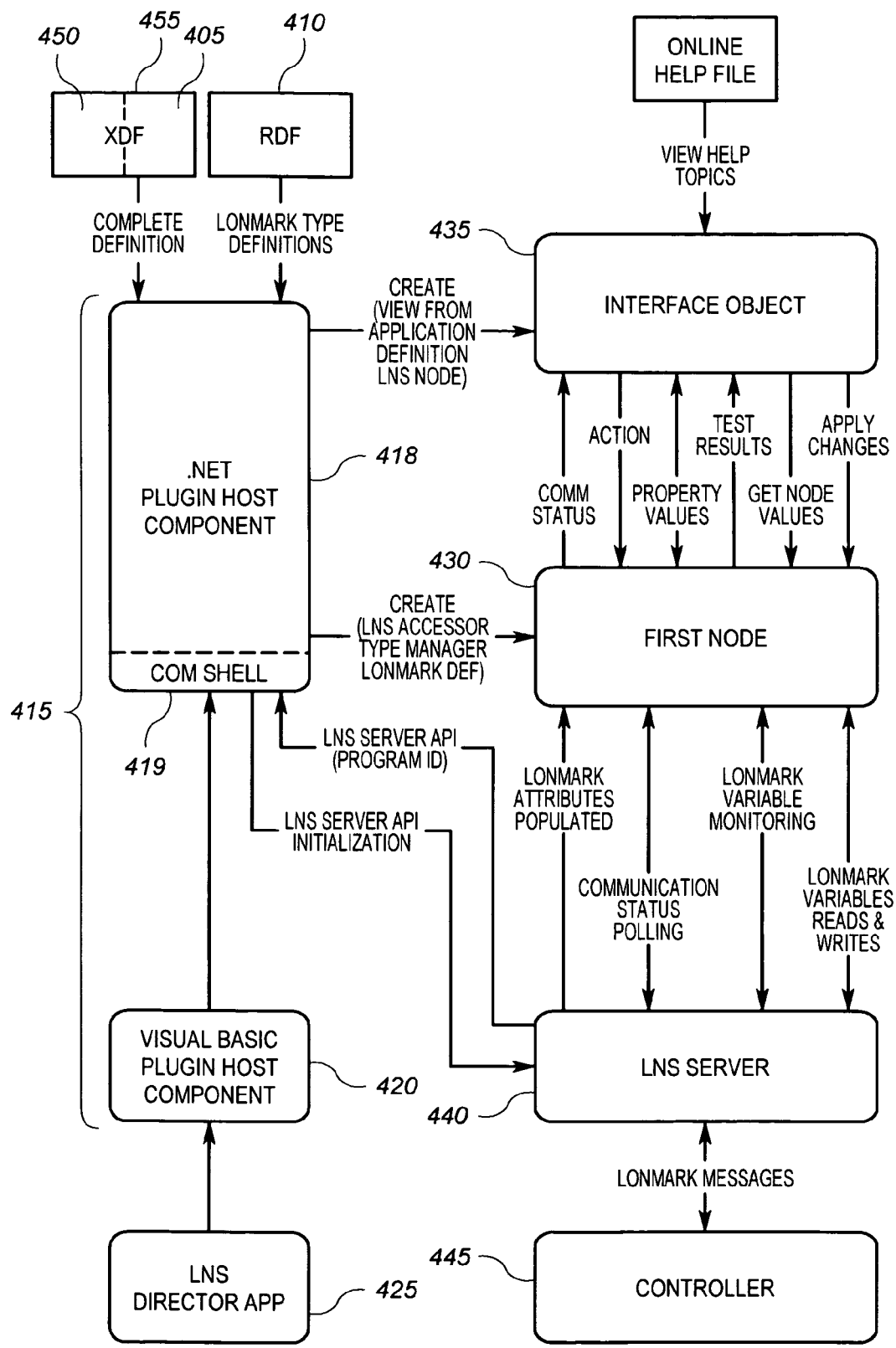
FIG. 4 shows a block diagram of a more detailed example of the embodiment of FIG. 2.

All of the elements of FIG. 4, except the controller 445 itself, may readily be implemented on a single machine, such as the portable tool (i.e. portable computer) 116 of FIG. 1. In general, the elements of FIG. 4 generally cooperate to carry out the operations of FIG. 3 to allow an application to provide user access to one or more variables or values that relate to the operation of the controller 445.

It will be appreciated that the above-described embodiments are merely exemplary, and those of ordinary skill in the art may readily devise their own implementations and modifications that incorporate the principles of the invention and fall within the spirit and scope thereof.

We claim:

1. A method of providing access to information on a controller in a building automation system, the method comprising:
    a) providing an external definition file, the external definition file including a first section that includes an application interface definition that defines a set of user interface displays and a second section that defines a functionality of objects using protocol-specific data corresponding to a first data format employed by the controller;
    b) employing a host application to create a first node comprising one or more objects based upon the protocol-specific data, the first node configured to communicate and exchange information with the controller using the first data format, the first node configured to process data received from the controller and communicate the processed data in a second data format; and
    c) employing the host application to create a user interface element based on the application interface definition, wherein the user interface element is configured to: receive the processed data from the first node in the second data format, to provide a user interface to the processed data and to receive user values via the user interface, and to provide the user values to the first node, wherein the first node is configured to convert the user values into information that causes an action by the controller.

2. The method of claim 1, wherein the first node and the user interface element comprise at least a portion of a plugin.

3. The method of claim 1, wherein step a) further comprises providing the external definition file as an XML file.

4. The method of claim 1, wherein the host component is configured as a .NET component within a COM shell.

5. A method of providing user access to a controller, the method comprising:
- a) providing an external definition file, the external definition file including a first section that includes an application interface definition that defines a set of user interface displays and a second section that defines implementation of objects using protocol-specific data;
- b) employing a host application to create a first node comprising one or more objects based upon the protocol-specific data, the first node configured to communicate with the controller; and
- c) employing the host application to create a user interface element based on the application interface definition, wherein the user interface element is configured to: provide a user interface to data relating to the controller received from the first node and to receive user values via the user interface, and to provide the user values to the first node, wherein the first node is configured to convert the user values into information that, when provided to the controller, causes an action by the controller;
- d) generating first data in a first controller relating to a building control system;
- e) providing first information representative of the generated first data to the first node;
- f) employing the first node to process the first information to generate second information, wherein the process employed by the first node is defined in the external definition file;
- g) employing the interface object to display information representative of the second information.

6. The method of claim 5, wherein the first node and the user interface element comprise a portion of a plugin.

7. The method of claim 5, wherein step a) further comprises providing the external definition file as an XML file.

8. The method of claim 5, wherein the host component is configured as a .NET component within a COM shell.

9. The method of claim 5, wherein the first node and the view dialog comprise a portion of a plugin program.

10. The method of claim 5, wherein step a) further comprises providing the external definition file as an XML file.

11. The method of claim 5, wherein the host component is configured as a .NET component within a COM shell.

\* \* \* \* \*